US011182613B2

(12) United States Patent
Bailey et al.

(10) Patent No.: US 11,182,613 B2
(45) Date of Patent: Nov. 23, 2021

(54) SYSTEMS AND METHODS FOR OCCLUDING IMAGES AND VIDEOS SUBJECT TO AUGMENTED-REALITY EFFECTS

(71) Applicant: Facebook, Inc., Menlo Park, CA (US)

(72) Inventors: William S. Bailey, San Francisco, CA (US); Ficus Kirkpatrick, Los Altos Hills, CA (US); Houman Meshkin, El Cerrito, CA (US); Ryan Keenan Olson, San Francisco, CA (US); Hermes Germi Pique Corchs, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 558 days.

(21) Appl. No.: 15/618,898

(22) Filed: Jun. 9, 2017

(65) Prior Publication Data
US 2018/0357480 A1 Dec. 13, 2018

(51) Int. Cl.

| G06K 9/00 | (2006.01) |
| G06T 7/13 | (2017.01) |
| G06T 7/12 | (2017.01) |
| G06T 5/00 | (2006.01) |
| H04N 13/361 | (2018.01) |
| G06T 11/00 | (2006.01) |
| G06Q 30/00 | (2012.01) |

(52) U.S. Cl.
CPC .......... *G06K 9/00671* (2013.01); *G06T 5/005* (2013.01); *G06T 7/12* (2017.01); *G06T 7/13* (2017.01); *G06T 11/001* (2013.01); *H04N 13/361* (2018.05); *G06Q 30/00* (2013.01)

(58) Field of Classification Search
CPC ....... G06K 9/00671; G06T 7/13; G06T 5/005; G06T 7/12; G06T 11/001; H04N 13/361
USPC .......................................................... 345/633
See application file for complete search history.

(56) References Cited

U.S. PATENT DOCUMENTS

| 6,516,032 B1* | 2/2003 | Heirich | H04N 19/593 |
| | | | 375/240.17 |
| 2005/0057574 A1* | 3/2005 | Andrews | G06T 15/005 |
| | | | 345/592 |
| 2005/0206652 A1* | 9/2005 | Soroushi | G03B 27/52 |
| | | | 345/629 |
| 2007/0058864 A1* | 3/2007 | Chien | G06K 9/3233 |
| | | | 382/173 |

(Continued)

*Primary Examiner* — Hai Tao Sun
(74) *Attorney, Agent, or Firm* — Baker Botts L.L.P.

(57) ABSTRACT

In one embodiment, a method includes a system accessing an image, which may comprise covered and uncovered portions, and an overlay image comprising opaque pixels. The covered portion may be configured to be covered by the opaque pixels of the overlay image. The system may generate a data structure comprising data elements associated with pixels of the image. Each of the data elements associated with a covered pixel in the covered portion of the image may be configured to identify an uncovered pixel in the uncovered portion of the image that is closest to the covered pixel. Each covered pixel in the covered portion of the image may be modified by accessing the data element associated with the covered pixel, determining a distance between the covered pixel and an associated closest uncovered pixel using the accessed data element, and modifying a color of the covered pixel based on the distance.

20 Claims, 12 Drawing Sheets

(56) References Cited

U.S. PATENT DOCUMENTS

2012/0092438 A1\* 4/2012 Guzman Suarez ...... H04N 7/15
                                                   348/14.03

\* cited by examiner

SYSTEMS AND METHODS FOR OCCLUDING IMAGES AND VIDEOS SUBJECT TO AUGMENTED-REALITY EFFECTS

TECHNICAL FIELD

This disclosure generally relates to augmented-reality effects, and more particularly to systems and methods for processing the images and videos intended to be covered by an augmented-reality effect.

BACKGROUND

Augmented reality provides a view of the real or physical world with added computer-generated sensory inputs (e.g., visual, audible). In other words, computer-generated virtual effects augment or supplement the real-world view. For example, a mobile phone with a camera may capture a real-world scene (as an image or video) and display a composite of the captured scene with computer-generated objects. The virtual objects may be, for example, two-dimensional and/or three-dimensional objects, and it may be stationary or animated. The virtual objects may be configured to be conceptually positioned anywhere within the captured scene. For example, from the perspective of a viewer, a virtual object may be positioned behind or in front of an object in the scene (e.g., a tree, a person, etc.). When the virtual object appears in front of the object in the scene, the virtual object in effect covers a portion of that object. Thus, the covered portion may not be visible to the viewer. In certain circumstances, a user who created an image/video with augmented-reality effects may have intended for the covered portion of the underlying image/video to be concealed.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user. One user may also send images and videos to other users of the social-networking system, such as those who are directly or indirectly connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments of this disclosure relate to systems and methods of occluding portions of an image/video that is intended to be covered by an overlay image (e.g., as part of an augmented-reality effect). In particular embodiments, pixels of the original image/video that is to be covered by an overlay image may be replaced so those pixels could not be uncovered. The covered region of the image/video may comprise border pixels that make up the border of the covered region (but still within the covered region) and interior pixels within the border. In particular embodiments, the interior pixels may be replaced with a masking color, such as black; pixels at the border, on the other hand, may copy color information from adjacent uncovered pixels. By duplicating color information at the border, compression artifacts outside the border may be improved since the compression algorithm would not use the masking cover to determine the color of those uncovered pixels outside and adjacent to the border. Instead, the colors of those uncovered pixels may be determined using their original color, which was copied into the border pixels of the covered region. This particular embodiment does not use or retain any color information within the covered region, which furthers the goal of ensuring that the covered region remains private.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Users may places overlays (e.g., static or animated) over images/videos to produce desired effects. When saving an image/video with an overlay, the overlay may be permanently incorporated into (or "baked into") the image/video. That is, the image/video and the augmented-reality overlay would no longer be separate entities but instead appear together in a modified image/video. While this may preserve the privacy concerns of users since the covered portions of the original image/video would permanently be concealed by the overlays. However, this may be undesirable for several reasons. For example, since media files are typically large in size, compression may be needed to accommodate limited resources (e.g., network bandwidth, storage, etc.). Compression, however, may degrade the quality of the media file and introduce undesirable artifacts. Thus, if an overlay becomes part of a media file, the quality of the overlay may degrade due to compression. Another drawback is the loss of flexibility to dynamically alter the appearance of the overlay at display time. For example, it may be desirable for an overlay to appear differently based on the orientation or movement of the user's device at view time. Such dynamic overlays may not be possible, however, if the overlay is no longer a stand-alone entity but is instead part of the image/video. Thus, it may be desirable for an application for creating overlay effects to store overlays separately from the original images/videos and generate the composite effects at consumption time.

Storing the original images/videos may raise privacy concerns, however. Since an overlay occludes a region of an image/video, there may be an expectation that the covered region will remain private. But as long as the original content is still available (either stored on a server or an end-user device), it remains possible to uncover that region and reveal its content.

Figure 1A:
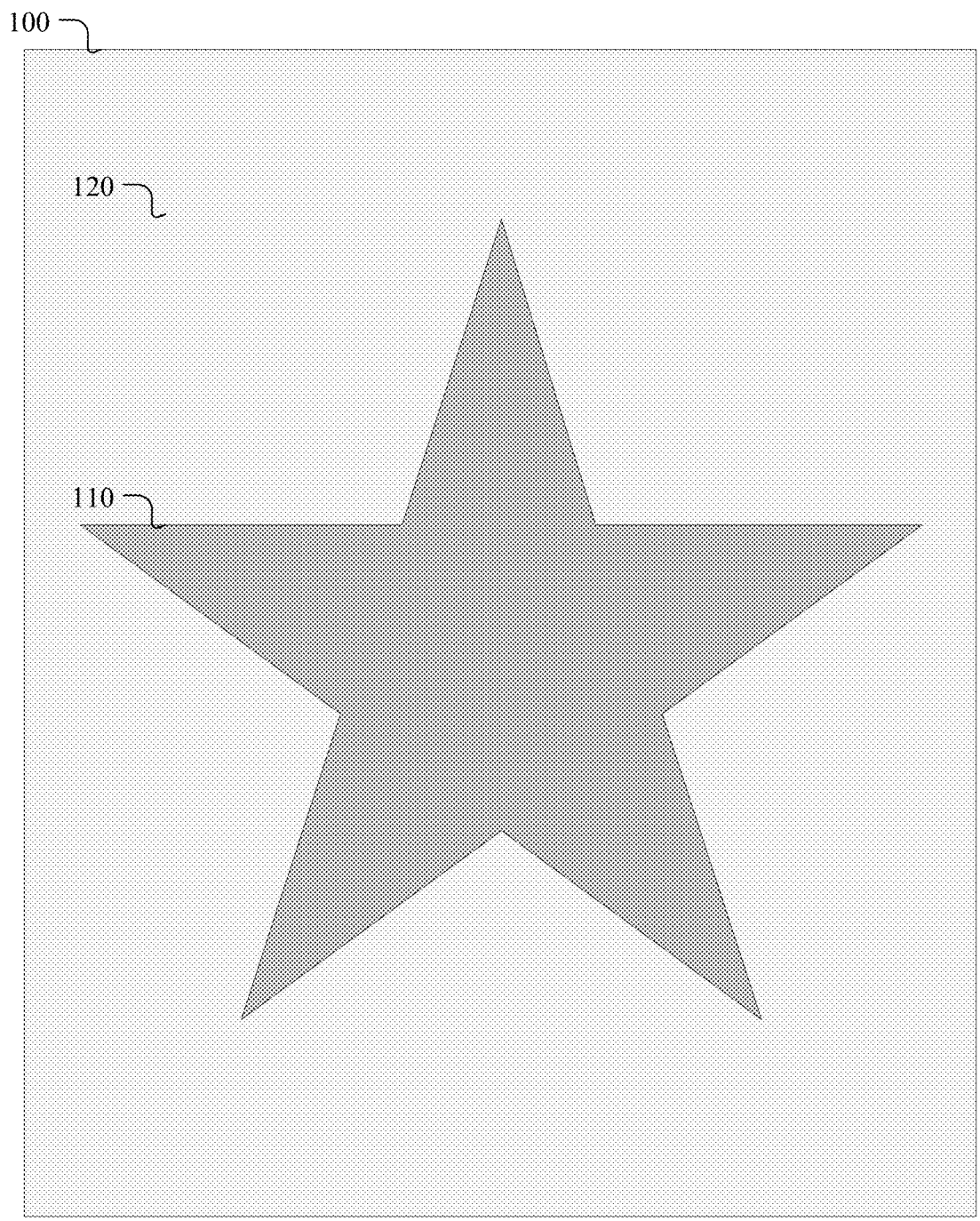
FIGS. 1A-1D illustrate an example of an image being covered by an overlay and being modified to preserve privacy expectations of the occluded portion.
Figure 1B:
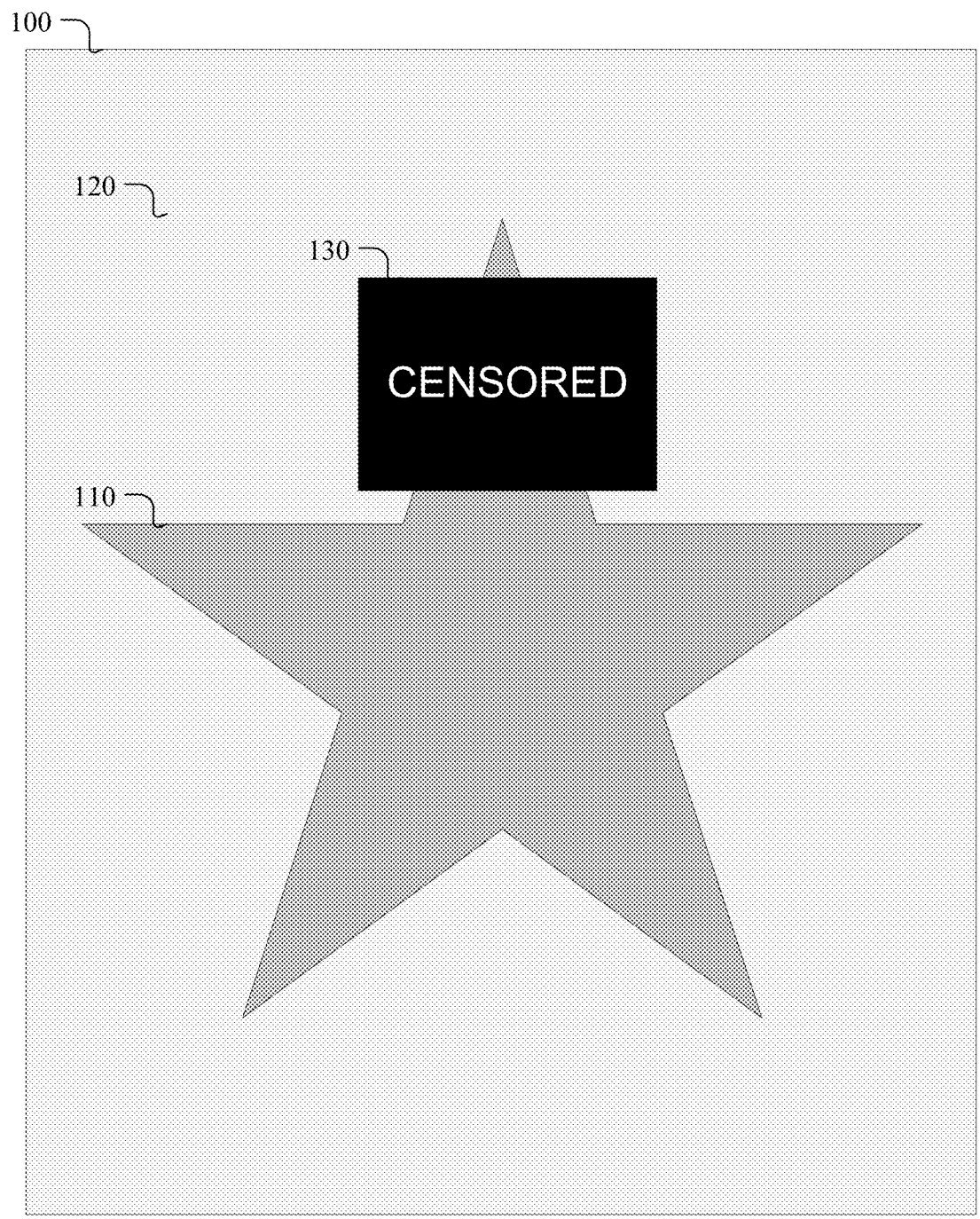
Figure 1C:
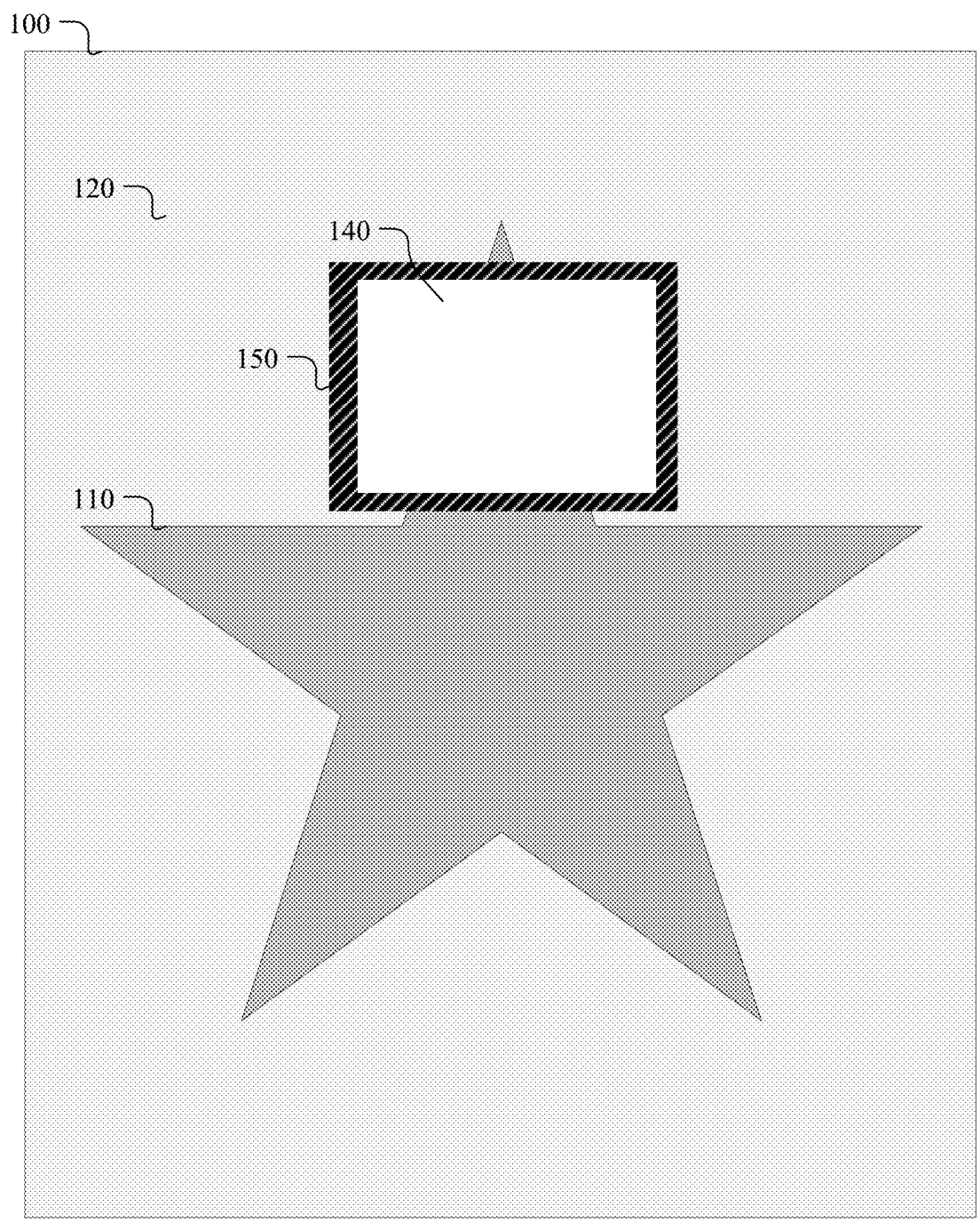

To ensure that a covered region can never be uncovered, one method in particular embodiments may be to remove the covered region from the original image/video. FIG. 1A illustrates an example of an image 100 or a frame 100 in a video, comprising a star 110 on top of a background 120. FIG. 1B illustrates an overlay 130 covering a portion of the image 100. The overlay 130 may be the projection of any visual object (e.g., 2D or 3D) projected onto the 2D plane of the image 100. The portion under the overlay 130 is occluded by the overlay 130, and the user who added the overlay 130 to the image 100 may expect that the occluded portion would remain private. FIG. 1C illustrates an example in particular embodiments where the image/video 100 on which the overlay 130 is placed may be altered such that the portion covered by the overlay is removed and replaced with a masking color 140. This may be permanently incorporated into the image/video 100 at the corresponding location of the overlay object to occlude what is expected to be hidden. The actual overlay or the corresponding augmented-reality element may be stored separately and combined with the modified version of the image/video at consumption time. One issue with this approach, however, may be that the visible region (or non-occluded region) of the image/video adjacent to the border 150 of the occluded region under the mask 140 may suffer from compression artifacts since a compression algorithm may analyze neighboring pixels and average the colors of neighboring pixels to generate a compressed version of the image/video. Thus, if an occluded region of an image/video 100 is replaced with a masking color 140, such as white in this example, a compression algorithm may cause the non-occluded pixels 150 adjacent to the border of the occluded region 140 (now replaced with white) to be represented by colors based in part on the white color of the occluded region 140. Even though the occluded region 140 will be covered by the overlay 130 in the final effect and will not be visible at consumption time, the non-occluded region 150 bordering it would be visible. This means that compression artifacts introduced at the borders 150 of the occluded region 140 would be visible, which may be undesirable.

Figure 1D:
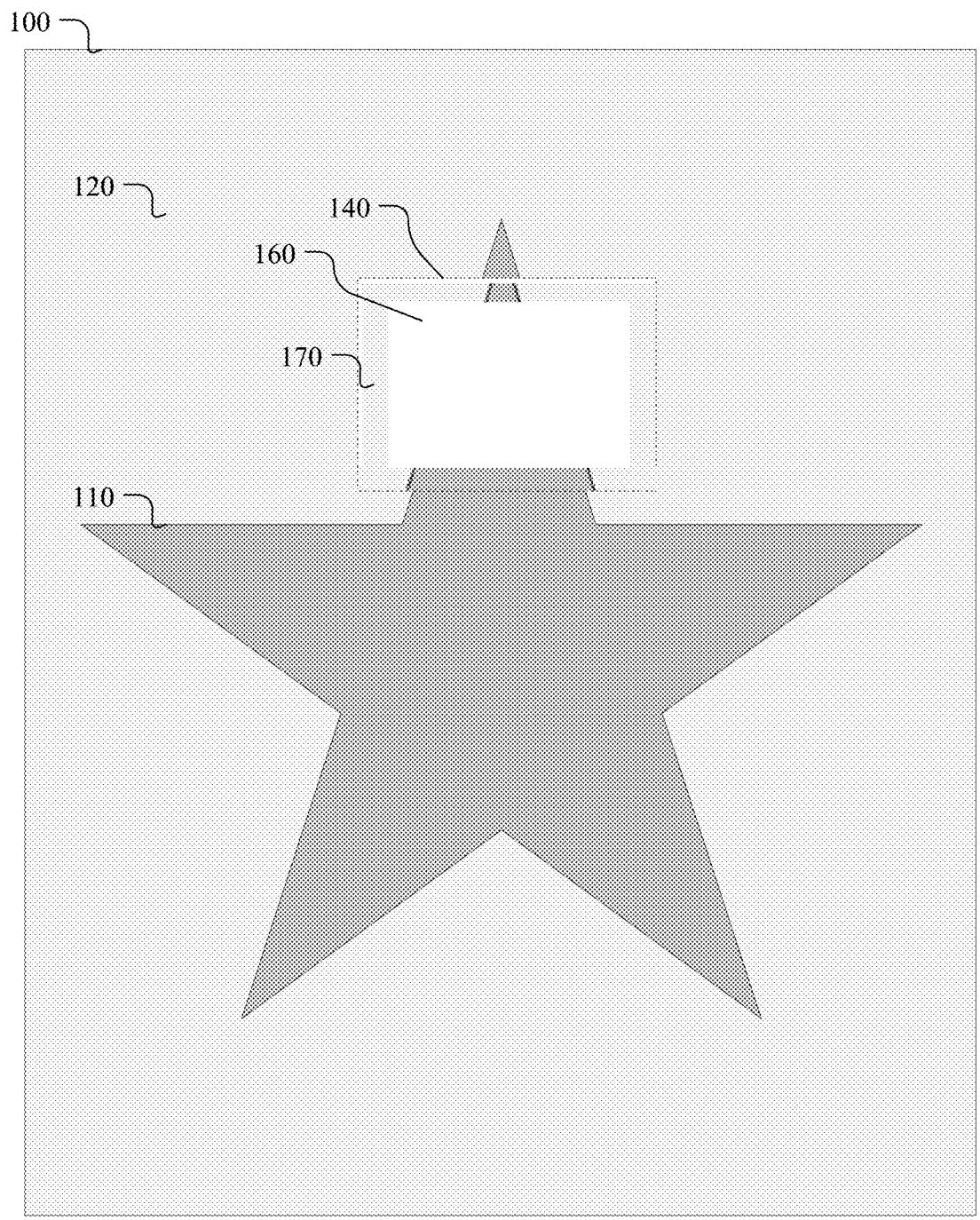

Particular embodiments described herein address the aforementioned problems. At a high level, pixels within and near the border of the occluded region may be replaced with color information from adjacent non-occluded pixels. For example, FIG. 1D illustrates the occluded region 140 having an interior border region 170 that adopts the colors of the adjacent pixels outside the occluded region 140, as well as an interior portion 160 within the interior border region 170 filled with the masking color. By duplicating color information at the border 170 the color of non-occluded pixels outside and adjacent to the border of the occluded region 140 would be unaffected (or at least the effect would be lessened) during compression by the masking color of the occluded region. Instead, the colors of those pixels may be based on their original colors, which were copied into the border region 170 of the occluded portion 140. Notably, this method does not use any color information within the occluded region 140, which furthers the goal of ensuring that the occluded region remains private.

Figure 2A:
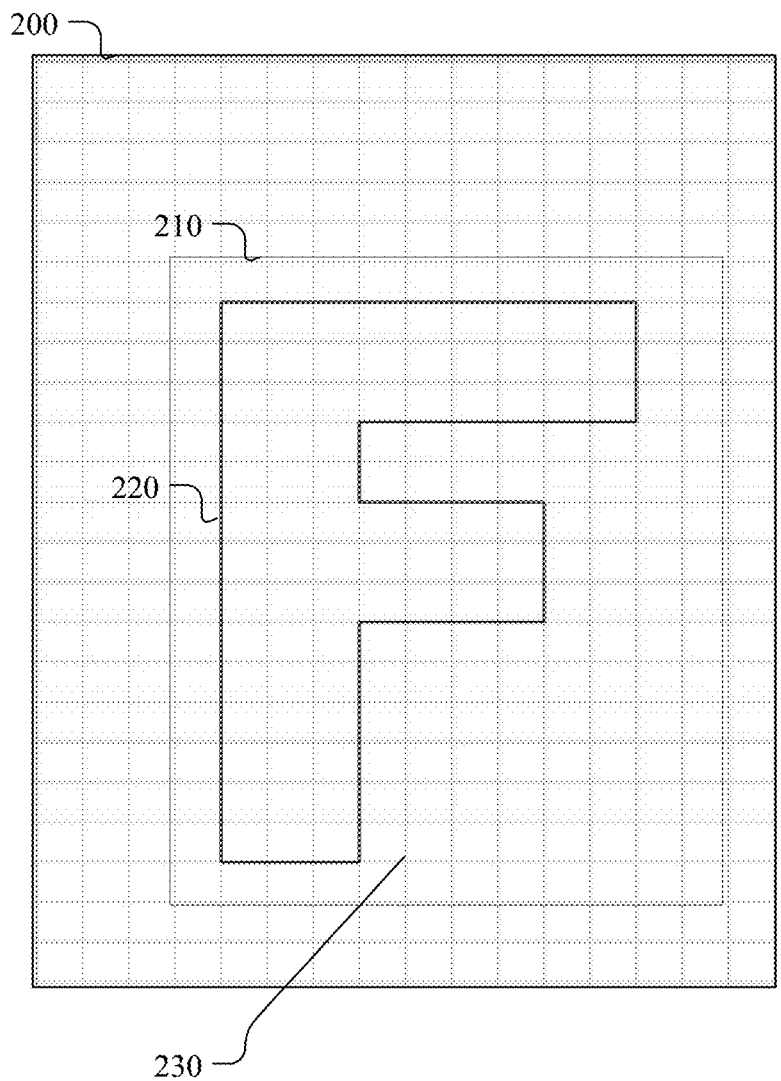
FIGS. 2A-2E illustrate an example of a distance map being generated.

Particular embodiments described herein may be used to lessen compression/encoding artifacts that may be introduced outside the border of an occluded region that is to be replaced with a masking color. Certain overlays, once placed over an image/frame, may remain stationary (e.g., similar to stickers). FIG. 2A illustrates an overlay 210 being placed over an image 200. The overlay 210 may comprise an opaque region 220, which in this case is in the shape of the letter "F," and a transparent region 230.

In particular embodiments, the system responsible for occluding the covered portion of the image 200 (e.g., the client device, a server, etc.) may be configured to generate a distance map. In particular embodiments, a distance map may be a matrix with cells that correspond to pixels of the overlay 210. The distance map may indicate locations of occluded regions (e.g., corresponding to the opaque region 220) and, for each pixel within those regions, information indicating where the closest (approximately) non-occluded pixel can be found (e.g., including pixels covered by the transparent region 230 of the overlay 210). In particular embodiments, the distance map may be generated by scanning the overlay image 200 in four direction to find the closest non-occluded pixel: left to right, right to left, top to bottom, and bottom to top. As indicated above, an overlay image 200 may have transparent pixels (e.g., in the transparent region 230) and opaque pixels (e.g., in the opaque region 220). In particular embodiments, each pixel in the distance map corresponding to a transparent pixel may be labeled with, e.g., 0. In particular embodiments, each pixel in the distance map corresponding to an opaque pixel may be labeled with a value that indicates where the closest non-occluded pixel (which may be covered by a transparent pixel) can be found. For example, when scanning from left to right, 0 may be entered for each transparent pixel until an opaque pixel is detected. For instance, if a series of three opaque pixels flanked by non-occluded pixels are detected during a left-to-right scan, the values pairs (left, 1), (left, 2), and (left, 3) may be entered for the three opaque pixels, respectively, to indicate the direction and distance to the closest detected non-occluded pixel in the line being scanned (which in this case would be the non-occluded pixel to the left of the left-most opaque pixel). When scanning from right to left, the values pairs for those three pixels may be (right, 3), (right, 2), and (right, 1), respectively. The value pairs with the smallest distance may ultimately be adopted. For example, after two horizontal scans from different directions, the distance map values for those three pixels may be (left, 1), (left 2), and (right, 1). The final distance map may then be used to determine how color information at the border of the occluded region should be copied.

Figure 2B:
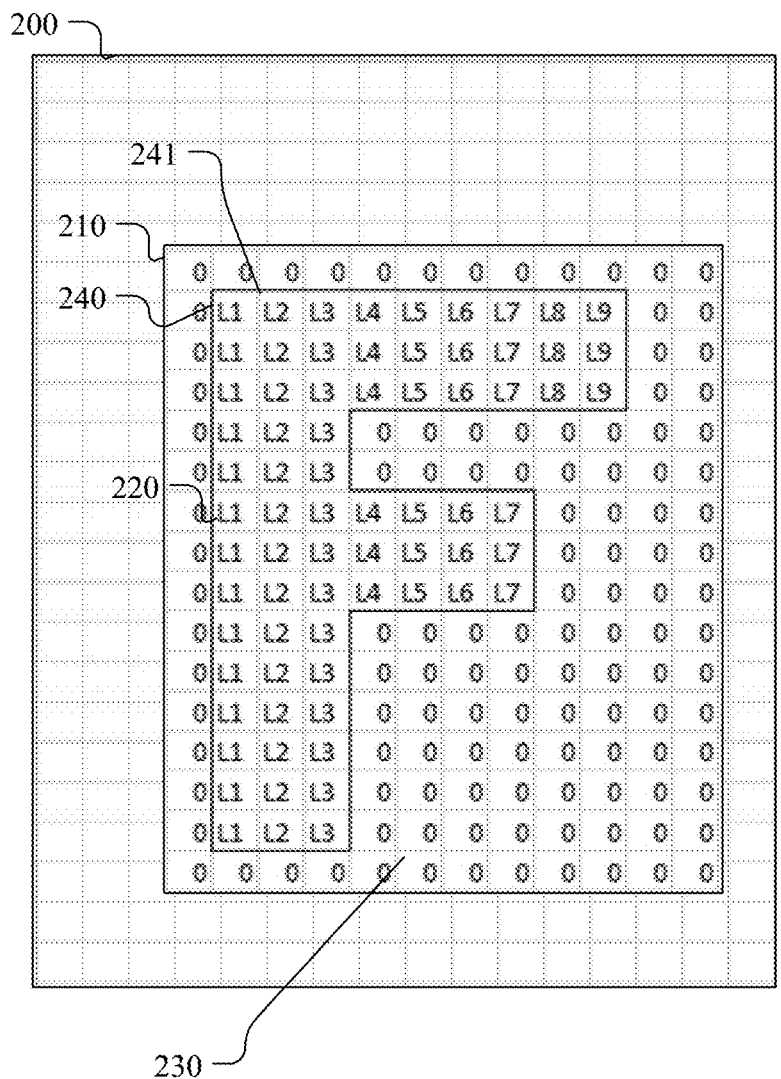

FIGS. 2B-2E illustrate an example progression of a distance map being generated. The illustrated examples conceptually overlap the distance map elements over their corresponding pixels. FIG. 2B illustrates the end of a left-to-right scan using the process described above. In this example, the distance map element corresponding to each opaque pixel 220 of the overlay 210 comprises a value pair with one value selected from [L, R, U, D], which represent Left, Right, Up, and Down, respectively, and another numeric value indicating the number of pixels from the current pixel where a non-occluded pixel may be located. When scanning left-to-right, the closest non-occluded pixel relative to the top-left corner pixel 240 of the "F" is located one pixel to its left, and therefore the distance map value corresponding to that top-left corner pixel is shown to be L1 (Left, 1). The next occluded pixel 241 is two-pixel distance away from the left-most non-occluded pixel, and therefore is assigned the value L2.

Figure 2C:
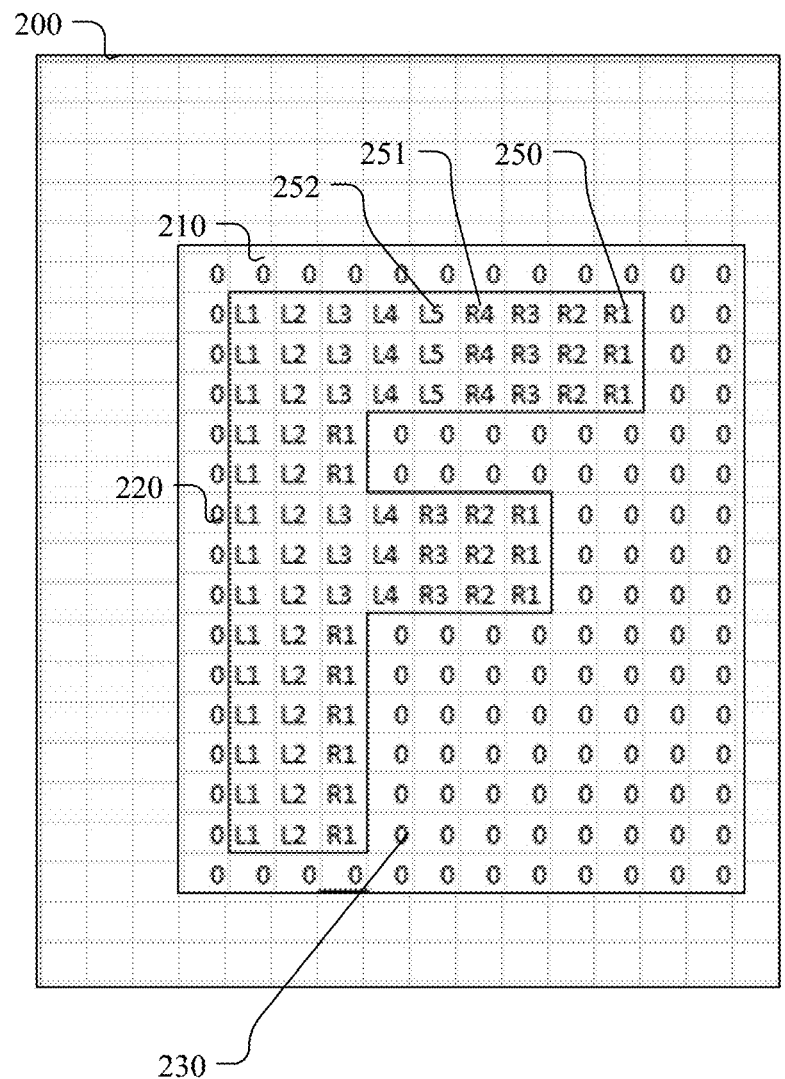

FIG. 2C illustrates how the distance map may be updated after the completion of a subsequent right-to-left scan. For example, when evaluating the pixel 250 at the top-right corner of the "F", the system may determine that the closest non-occluded pixel is one pixel to the right (R1). Referring back to FIG. 2B, the distance map element for that pixel after the left-to-right scan indicates that the closest left-side pixel is nine pixels away (L9). Since one-pixel distance is closer than nine pixels, the corresponding distance map element is changed from L9 (shown in FIG. 2B) to R1 (shown in FIG. 2C). This analysis continues for each pixel. For example, the fourth pixel 251 from the top-right corner of "F" is four pixels away from the closest right-side non-occluded pixel (R4), which is closer than the closest left-side non-occluded pixel (L6, as indicated in FIG. 2B). The fifth pixel 252 from the top-right corner of "F," however, remains L5 from the previous iteration, since the closest right-side non-occluded pixel is also five pixels away (it would be R5). In particular embodiments, replacement may only occur if a new distance is closer than the previous distance. However, it should be appreciated that replacement may also occur where the new distance is equal to the previous distance.

Figure 2D:
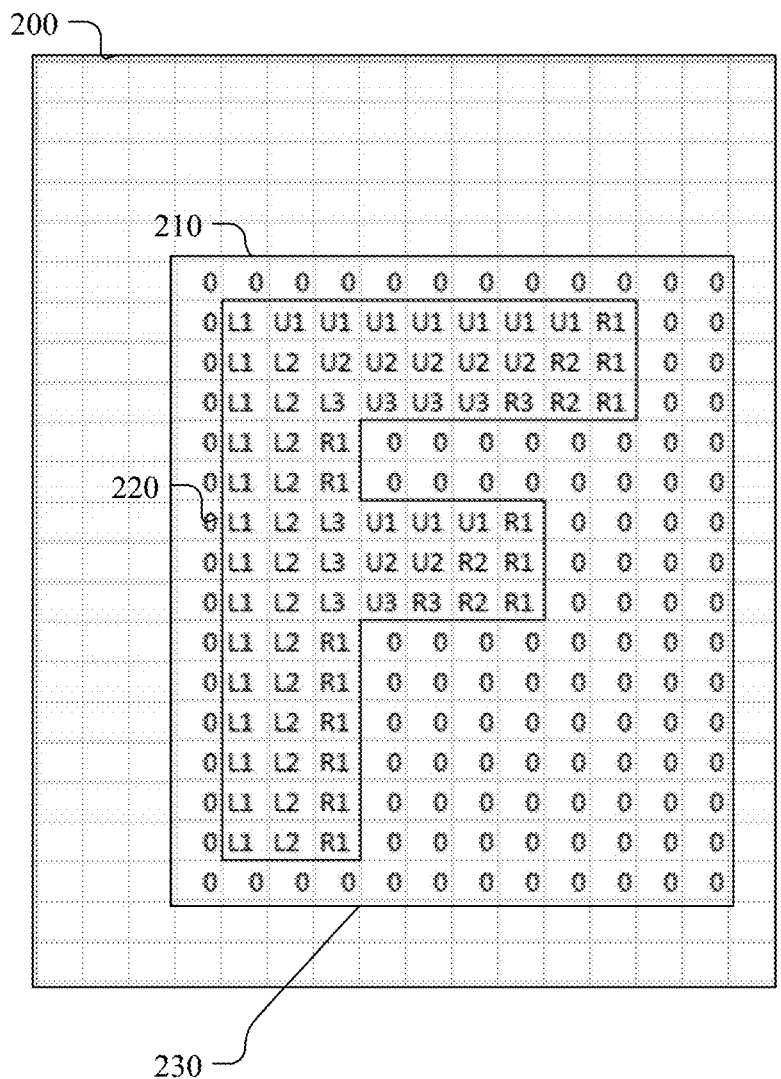
Figure 2E:
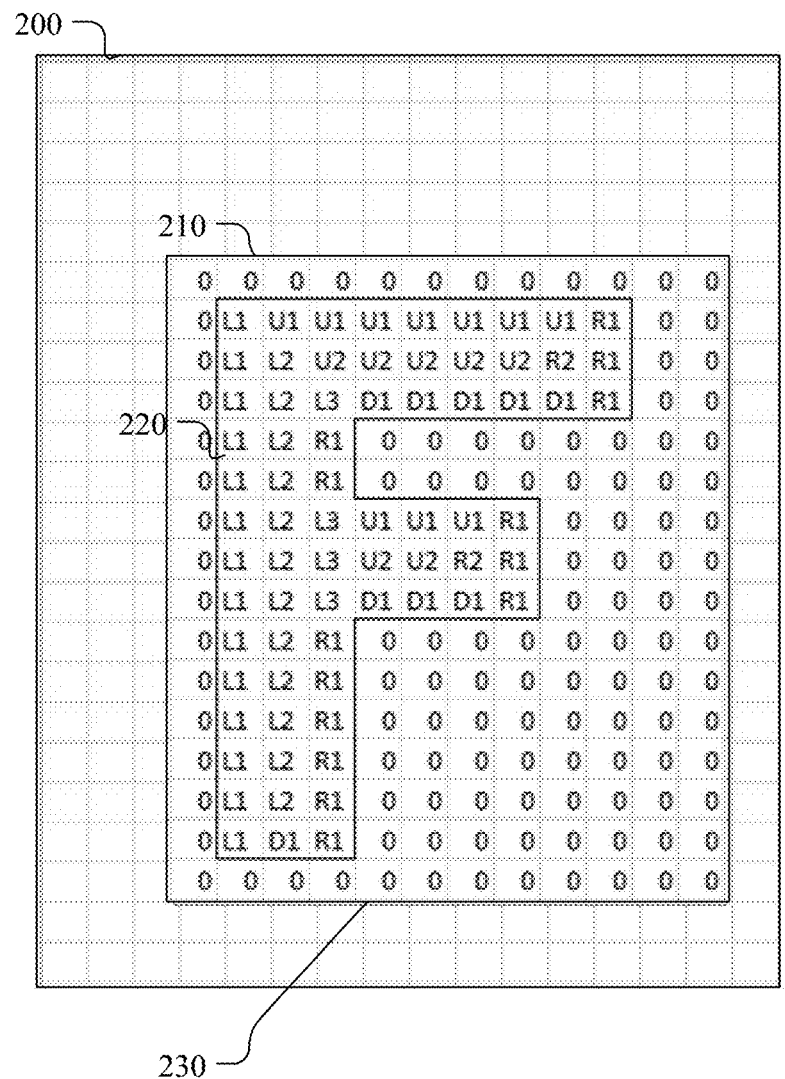

FIG. 2D illustrates how the distance map may be updated after the completion of a subsequent top-to-bottom scan, and FIG. 2E illustrates how the distance map may be updated after the completion of a subsequent bottom-to-top scan, using the a similar process described with respect to FIGS. 2B and 2C. As shown in FIG. 2E, the border pixels of the occluded region 220 ("F") have corresponding distance map elements that indicate where adjacent non-occluded pixels may be found (in this example, all the border distances are a distance of 1 from one of the four directions).

In particular embodiments, the distance map may be used to process the image 200 to permanently remove the occluded region. For every pixel in the distance map that corresponds to an overlay (e.g., opaque pixels represented by non-0 values), the corresponding pixel in the image 200 that would be covered by the overlay may be replaced with a masking color (e.g., white). In particular embodiments, the masking color used to fill in the occluded region may be any suitable color that would minimize image/video size. The particular color may depend on the compression algorithm. In particular embodiments, the border pixels within the occluded region need not be replaced with the masking color, since it would adopt the color of the closest non-occluded pixel in the image 200. Border pixels (e.g., label 170 in FIG. 11)) that are within an occluded region would instead copy the color of the closets non-occluded pixel. The closest non-occluded pixel may be found using the distance map. For example, to determine the color of a pixel that is within and adjacent to a border of an occluded region, the corresponding pixel in the distance map may be used. If the value stored in the distance map is, e.g., (right, 1), the closest non-occluded pixel may be found one pixel to the right of the current pixel. That color of the current pixel in the image may then be set to that of the identified non-occluded pixel in the image 200.

Certain types of animated overlays may have fixed boundaries (e.g., sparkles on top of face). There are several ways to effectuate this type of animated but stationary overlay over an image. One possibility is to generate a video, with each frame of the video being a composite of the image and one frame of the overlay. Another approach is to permanently incorporate the first frame of the animated overlay into the image (thereby preserving privacy expectations). The rest of the animation may be separately stored/transmitted and combined with the modified version of the image at consumption time. In particular embodiments, the first frame of the animated overlay may be treated as a non-animated, stationary overlay. As such, the manner of masking the occluded portion of the image may be based on the process described above with respect to stationary image overlays.

Stationary overlays may be placed over videos as well. In particular embodiments, the same process for generating a distance map for the stationary overlay as described above may be used. The distance map may then be used to process each frame of the video to remove regions occluded by the overlay.

Dynamic (non-stationary) overlays that change locations overtime may be placed over a video. In particular embodiments, each frame of the overlay may be compared to the corresponding frame in the video to identify and mask the occluded regions. In particular embodiments, pixels outside of the occluded regions may be copied into the occluded regions using the approach described above. For instance, for each frame of an overlay animation, a distance map may be generated as described above. The distance map for each frame of the overlay animation may be used to remove occluded regions of the corresponding frame of the video.

In particular embodiments, prior to perform the masking process as described above, the system may determine whether masking is needed. In particular embodiments involving an augmented reality overlay being placed over a video, the system may dynamically determine whether a region of the video is always covered by the overlay. For instance, for videos that display a constant scene (which may be detected based on frame-to-frame comparisons, for example), the overlay application may check whether any region of the scene is occluded by an overlay throughout the duration of the video. Such regions may be removed and masked, using the process described above. However, if a region of the video is only occluded at certain times but revealed at other times, no privacy processing may be needed.

In particular embodiments, the system may also determine whether an overlay is sufficiently sized to trigger any privacy concerns. For example, the overlay application may analyze the dimensions of an overlay to determine whether it is of sufficiently size to raise privacy concerns. For example, thin lines or text may not sufficiently occlude any content, and therefore no privacy processing may be needed. In particular embodiments, a threshold size (e.g., number of continuous pixels) and/or threshold dimension (e.g., the overlay may need to have a minimum width and/or height) may be required in order for privacy processing to commence.

Figure 3:
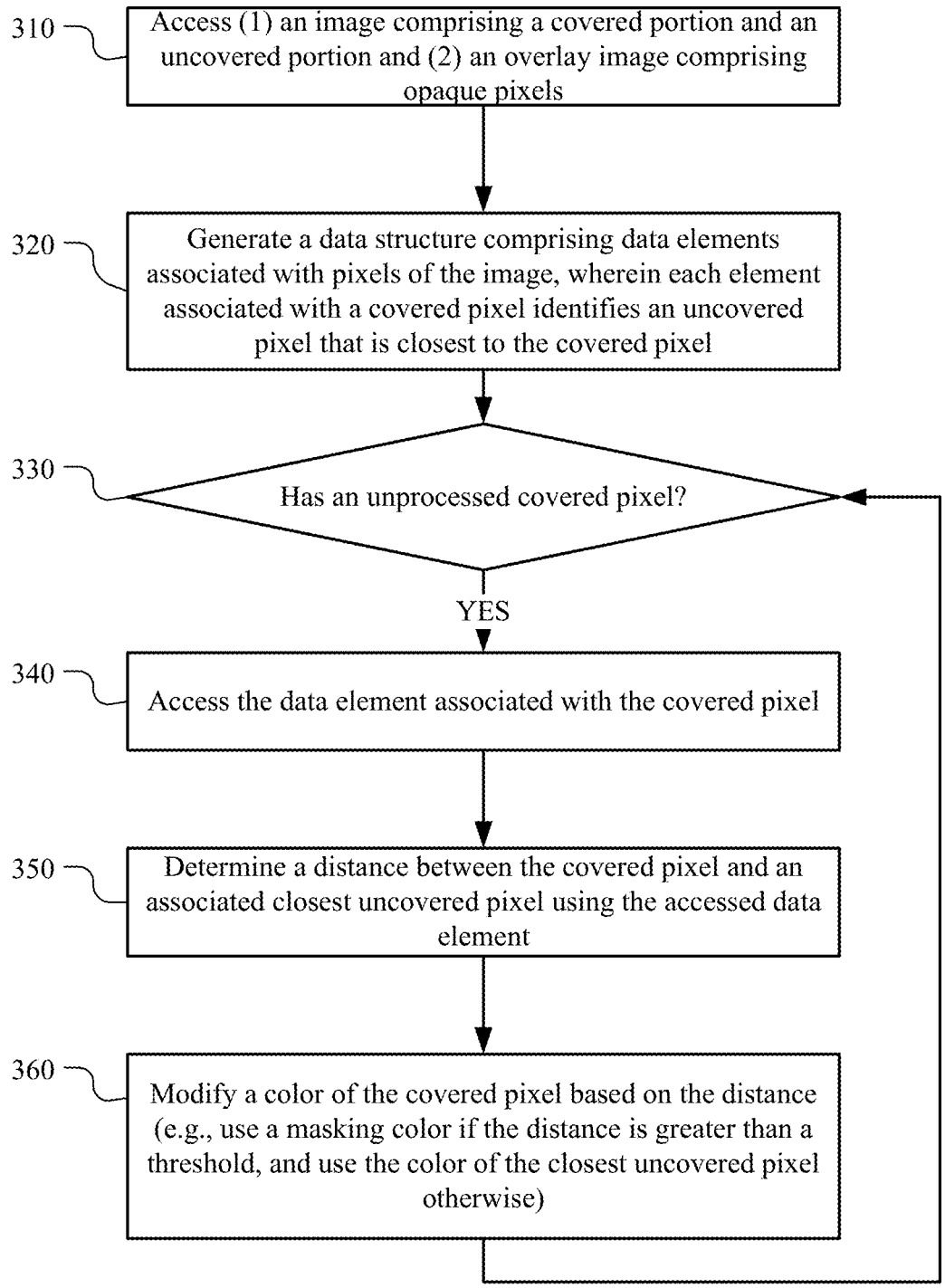
FIG. 3 illustrates an example method for masking a portion of an image occluded by an overlay.

FIG. 3 illustrates an example method 300 for masking a portion of an image covered/occluded by an overlay. In particular embodiments, the process may be performed by a computing system, such as a user's device executing software associated with an application for generating an augmented reality effect. In particular embodiments, the computing system may be the user's device executing software associated with a distribution platform (e.g., social-networking system, direct messaging/chat system, etc.) for distributing media with augmented reality effects. In particular embodiments, the computing system may also be the server associated with the distribution platform. The process may begin at step 310, where the computing system may access an image and an overlay image. The overlay image may comprise opaque pixels and/or transparent pixels. The image may comprise a covered portion and an uncovered portion. The covered portion may be configured to be covered by the opaque pixels of the overlay image. At step 320, the computing system may generate a data structure (e.g., distance map) comprising data elements associated with pixels of the image. In particular embodiments, each of the data elements associated with a covered pixel in the covered portion of the image may be configured to identify an uncovered pixel in the uncovered portion of the image that is closest to the covered pixel. At step 330, the system may process and modify each covered pixel in the covered portion of the image. For each such pixel, the system at step 340 may access the data element associated with the covered pixel. At step 350, the system may determine a distance between the covered pixel and an associated closest uncovered pixel using the accessed data element. At step 360, the system may modify a color of the covered pixel based on the distance. For example, the color of the covered pixel may be modified to (1) a predetermined masking color when the distance exceeds a threshold, or (2) a color of the closest uncovered pixel when the distance does not exceed the threshold. After the covered pixels have been modified, the image and any augmented reality effect may be transmitted to a server or other users for distribution. Since the covered/occluded portion has been permanently removed, privacy expectations are ensured. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for masking a portion of an image occluded by an overlay including the particular steps of the method of FIG. 3, this disclosure contemplates any suitable method for masking a portion of an image occluded by an overlay, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
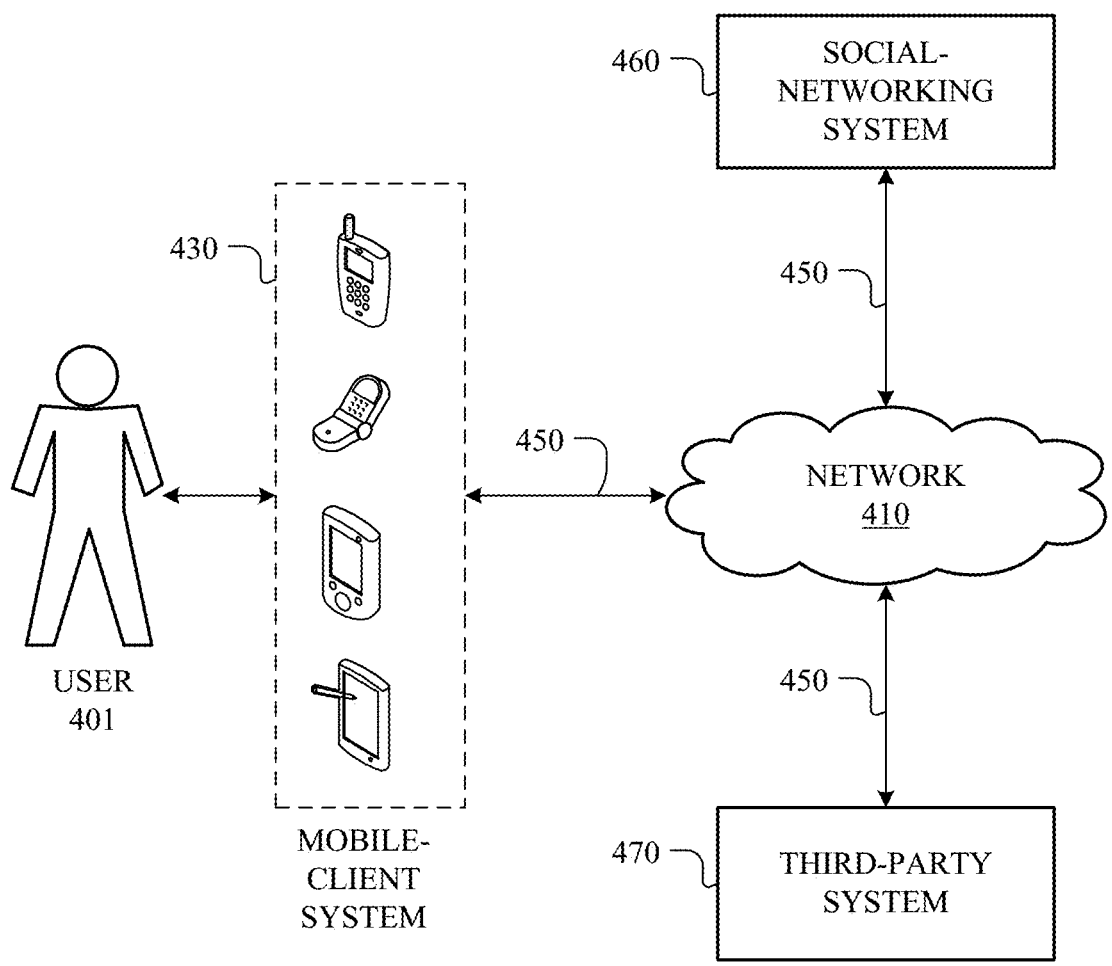
FIG. 4 illustrates an example network environment associated with a social-networking system.

FIG. 4 illustrates an example network environment 400 associated with a social-networking system. Network environment 400 includes a user 401, a client system 430, a social-networking system 460, and a third-party system 470 connected to each other by a network 410. Although FIG. 4 illustrates a particular arrangement of user 401, client system 430, social-networking system 460, third-party system 470, and network 410, this disclosure contemplates any suitable arrangement of user 401, client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of users 401, client systems 430, social-networking systems 460, third-party systems 470, and networks 410. As an example and not by way of limitation, network environment 400 may include multiple users 401, client system 430, social-networking systems 460, third-party systems 470, and networks 410.

In particular embodiments, user 401 may be an individual (human user), an entity (e.g., an enterprise, business, or third-party application), or a group (e.g., of individuals or entities) that interacts or communicates with or over social-networking system 460. In particular embodiments, social-networking system 460 may be a network-addressable computing system hosting an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include an authorization server (or other suitable component(s)) that allows users 401 to opt in to or opt out of having their actions logged by social-networking system 460 or shared with other systems (e.g., third-party systems 470), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 470 may be accessed by the other components of network environment 400 either directly or via network 410. In particular embodiments, one or more users 401 may use one or more client systems 430 to access, send data to, and receive data from social-networking system 460 or third-party system 470. Client system 430 may access social-networking system 460 or third-party system 470 directly, via network 410, or via a third-party system. As an example and not by way of limitation, client system 430 may access third-party system 470 via social-networking system 460. Client system 430 may be any suitable computing device, such as, for example, a personal computer, a laptop computer, a cellular telephone, a smartphone, a tablet computer, or an augmented/virtual reality device.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

Figure 5:
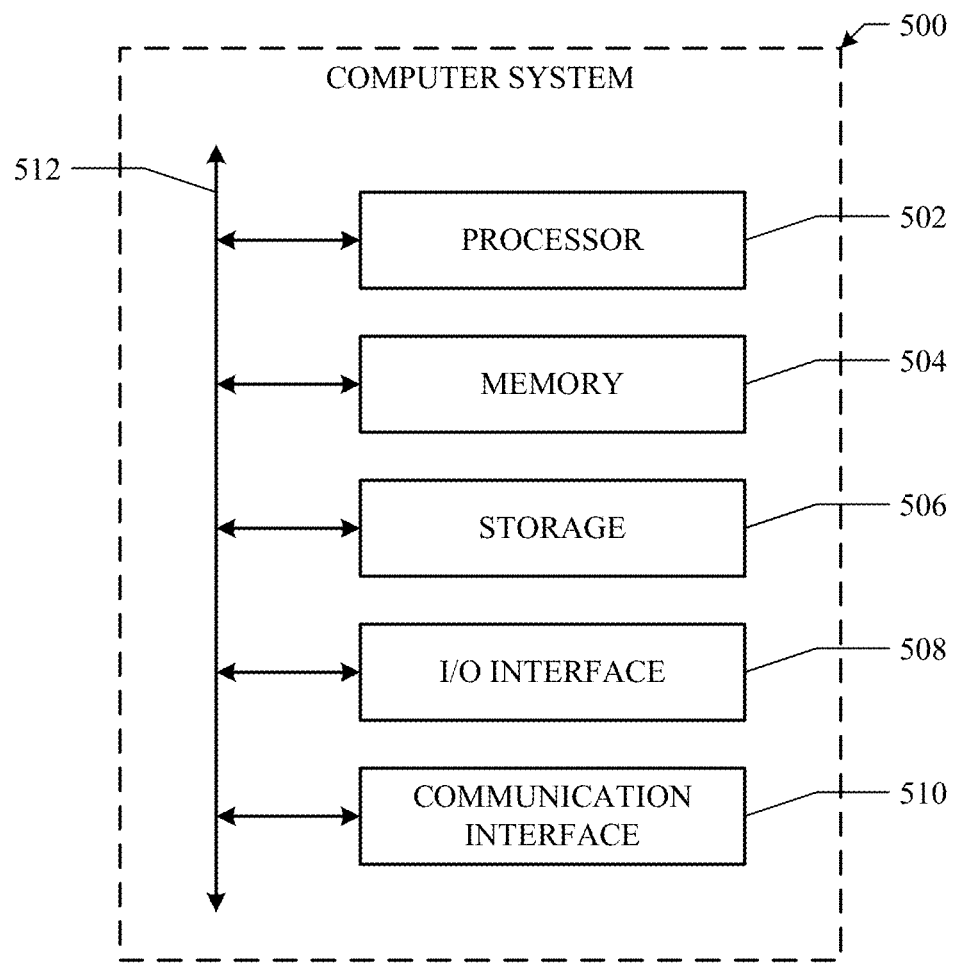
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EPROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
by a computing system, accessing a first image and an overlay image, wherein the overlay image comprises opaque pixels, wherein the first image comprises a covered portion and an uncovered portion, wherein the covered portion is configured to be covered by the opaque pixels of the overlay image;
by the computing system, generating a data structure comprising data elements associated with pixels of the first image, wherein each of the data elements associated with a covered pixel in the covered portion of the first image is configured to identify an uncovered pixel in the uncovered portion of the first image that is closest to the covered pixel;
by the computing system, modifying each covered pixel in the covered portion of the first image by:
accessing the data element associated with the covered pixel;
determining a spatial distance between the covered pixel of the first image and an associated neighboring uncovered pixel of the first image using the accessed data element; and
modifying a color of the covered pixel to a color of the neighboring uncovered pixel when the spatial distance satisfies at least a predetermined criterion.

2. The method of claim 1, further comprising:
by the computing system, compressing the modified first image; and
by the computing system, transmitting the compressed modified first image and the overlay image to a user device;
wherein the overlay image is configured to be displayed on top of the compressed modified first image.

3. The method of claim 1, wherein each of the opaque pixels in the overlay image is associated with one of the data elements in the data structure.

4. The method of claim 1,
wherein the overlay image comprises one or more rows of pixels and one or more columns of pixels;
wherein the generating of the data structure comprises:
for each row of the pixels in the overlay image, sequentially processing the pixels in the row from a first direction and from a second direction; and
for each column of the pixels in the overlay image, sequentially processing the pixels in the column from a third direction and from a fourth direction.

5. The method of claim 1,
wherein the overlay image comprises one or more rows of pixels and one or more columns of pixels;
wherein each of the opaque pixels in the overlay image is associated with one of the rows of pixels and one of the columns of the pixels;
wherein the generating of the data structure comprises:
for at least one of the opaque pixels in the overlay image:
determining a first spatial distance between the opaque pixel and a first non-opaque pixel in the associated row of pixels, the first non-opaque pixel being a closest non-opaque pixel that is located left of the opaque pixel;
determining a second spatial distance between the opaque pixel and a second non-opaque pixel in the associated row of pixels, the second non-opaque pixel being a closest non-opaque pixel that is located right of the opaque pixel;
determining a third spatial distance between the opaque pixel and a third non-opaque pixel in the associated column of pixels, the third non-opaque pixel being a closest non-opaque pixel that is located above the opaque pixel;
determining a fourth spatial distance between the opaque pixel and a fourth non-opaque pixel in the associated column of pixels, the fourth non-opaque pixel being a closest non-opaque pixel that is located below the opaque pixel;
selecting a closest non-opaque pixel based on the first spatial distance, the second spatial distance, the third spatial distance, and the fourth spatial distance; and
generating one of the data elements based on the selected closest non-opaque pixel.

6. The method of claim 5, wherein the generated data element comprises a direction value and a spatial distance value associated with the selected closest non-opaque pixel.

7. The method of claim 1,
wherein the overlay image is one of a plurality of frames in an animated overlay effect;
wherein each of the plurality of frames comprises opaque pixels; and
wherein locations of the opaque pixels in the overlay image correspond to locations of the opaque pixels in each of the plurality of frames.

8. The method of claim 7, wherein the first image is one of a plurality of frames in a video, the method further comprising:
modifying each of the other frames in the video using the data structure.

9. The method of claim 1,
wherein the overlay image is one of a plurality of frames in an animated overlay effect;
wherein the first image is one of a plurality of frames in a video;
wherein each of the plurality of frames in the video is configured to be covered by an associated frame of the plurality of frames in the animated overlay effect; and
wherein each of the plurality of frames in the video comprises a covered portion that is covered by opaque pixels of the associated frame in the animated overlay effect.

10. The method of claim 9, further comprising:
for each of the plurality of frames in the video:
generating a corresponding data structure using the associated frame in the animated overlay effect; and
modifying the frame in the video using the corresponding data structure.

11. The method of claim 9, further comprising:
determining that the location of the covered portion of the first image corresponds to the locations of the covered portions of the other frames in the video.

12. The method of claim 1, further comprising:
determining that a region defined by the opaque pixels of the overlay image satisfies predetermined conditions associated with size and shape.

13. The method of claim 1, wherein the modifying of each covered pixel in the covered portion of the first image further comprises:
modifying the color of the covered pixel to a predetermined masking color when the spatial distance fails to satisfy the predetermined criterion.

14. One or more computer-readable non-transitory storage media embodying software that is operable when executed to:
access a first image and an overlay image, wherein the overlay image comprises opaque pixels, wherein the first image comprises a covered portion and an uncovered portion, wherein the covered portion is configured to be covered by the opaque pixels of the overlay image;
generate a data structure comprising data elements associated with pixels of the first image, wherein each of the data elements associated with a covered pixel in the covered portion of the first image is configured to identify an uncovered pixel in the uncovered portion of the first image that is closest to the covered pixel;
modify each covered pixel in the covered portion of the first image by:
accessing the data element associated with the covered pixel;
determining a spatial distance between the covered pixel of the first image and an associated neighboring uncovered pixel of the first image using the accessed data element; and
modifying a color of the covered pixel to a color of the neighboring uncovered pixel when the spatial distance satisfies at least a predetermined criterion.

15. The media of claim 14, wherein the software is further operable when executed to:
compress the modified first image; and
transmit the compressed modified first image and the overlay image to a user device;
wherein the overlay image is configured to be displayed on top of the compressed modified first image.

16. The media of claim 14,
wherein the overlay image comprises one or more rows of pixels and one or more columns of pixels;
wherein the software, when generating the data structure, is further operable to:
for each row of the pixels in the overlay image, sequentially process the pixels in the row from a first direction and from a second direction; and
for each column of the pixels in the overlay image, sequentially process the pixels in the column from a third direction and from a fourth direction.

17. The media of claim 14, wherein the software, when modifying each covered pixel in the covered portion of the first image, is further operable to:
modify the color of the covered pixel to a predetermined masking color when the spatial distance fails to satisfy the predetermined criterion.

18. A system comprising: one or more processors; and a memory coupled to the processors comprising instructions executable by the processors, the processors being operable when executing the instructions to:
access a first image and an overlay image, wherein the overlay image comprises opaque pixels, wherein the first image comprises a covered portion and an uncovered portion, wherein the covered portion is configured to be covered by the opaque pixels of the overlay image;
generate a data structure comprising data elements associated with pixels of the first image, wherein each of the data elements associated with a covered pixel in the covered portion of the first image is configured to identify an uncovered pixel in the uncovered portion of the first image that is closest to the covered pixel;
modify each covered pixel in the covered portion of the first image by:
accessing the data element associated with the covered pixel;
determining a spatial distance between the covered pixel of the first image and an associated neighboring uncovered pixel of the first image using the accessed data element; and
modifying a color of the covered pixel to a color of the neighboring uncovered pixel when the spatial distance satisfies at least a predetermined criterion.

19. The system of claim 18,
wherein the overlay image comprises one or more rows of pixels and one or more columns of pixels;
wherein the processors, when executing the instructions to generate the data structure, is operable to:
for each row of the pixels in the overlay image, sequentially process the pixels in the row from a first direction and from a second direction; and for each column of the pixels in the overlay image, sequentially process the pixels in the column from a third direction and from a fourth direction.

20. The system of claim 18, wherein the processors, when executing the instructions to modify each covered pixel in the covered portion of the first image, is operable to:

modify the color of the covered pixel to a predetermined masking color when the spatial distance fails to satisfy the predetermined criterion.

* * * * *